June 7, 1960 L. E. RAVICH 2,939,938
INFRA RED CELL METHODS AND APPLICATIONS
Filed Oct. 30, 1953 2 Sheets-Sheet 1
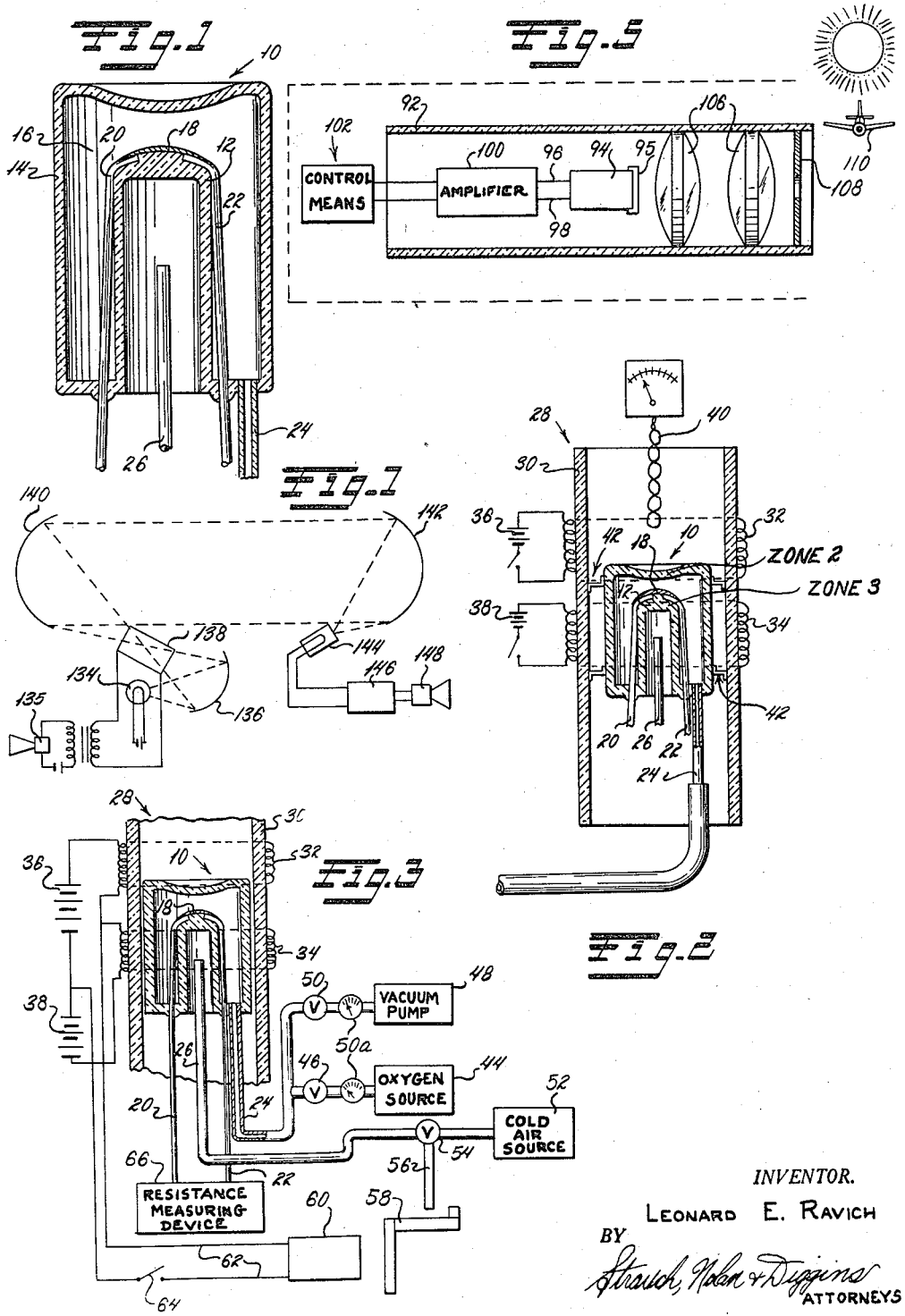
INVENTOR.
LEONARD E. RAVICH
BY
ATTORNEYS

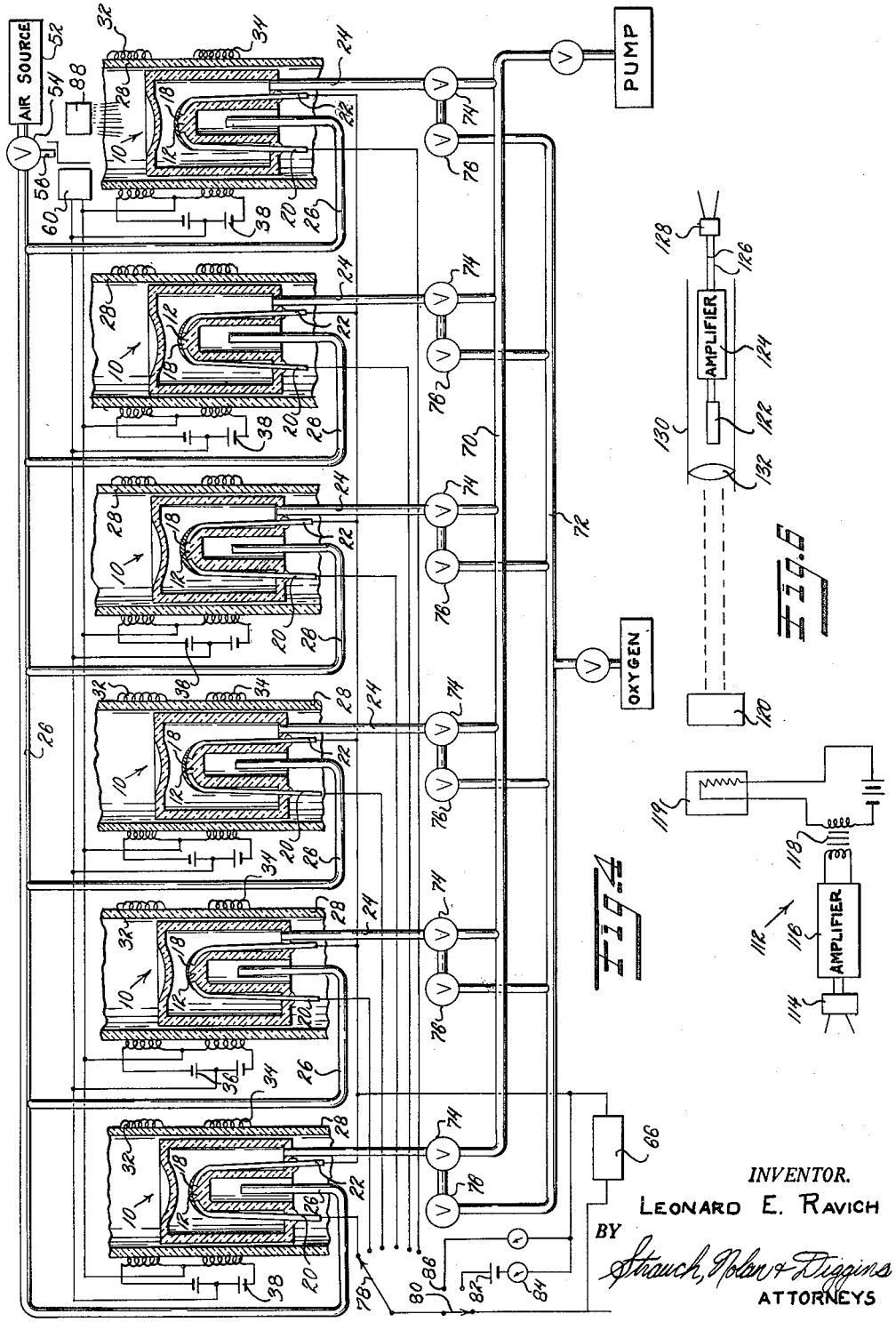

2,939,938
Patented June 7, 1960

2,939,938

INFRA RED CELL METHODS AND APPLICATIONS

Leonard E. Ravich, New York, N.Y., assignor, by mesne assignments, to Hupp Corporation, Cleveland, Ohio, a corporation of Virginia Filed Oct. 30, 1953, Ser. No. 389,228

3 Claims. (Cl. 219—20)

This invention relates to improvements in the production and application of an infra-red responsive cell.

It is an object of this invention to provide new and improved means of producing a photocell.

It is also an object of this invention to provide a guided missile with a new and useful means for detecting the presence of infra-red rays emitted by an aeroplane or the like body.

Other and further objects of this invention will become apparent in the disclosure herewith in conjunction with the accompanying drawings in which:

Figure 1 is a sectional view of a photocell at one step in its manufacture.

Figure 2 is a plan view of an electric oven, and shows heating zones and a photosensitive cell in the heating zones.

Figure 3 is a diagrammatic showing of the electric oven and connections from the photosensitive cell to various services.

Figure 4 is a diagrammatic showing of a plurality of oven and cells and their related services.

Figure 5 is a diagrammatic showing of a missile and a photosensitive cell.

Figure 6 is a diagrammatic showing of a communication system.

Figure 7 is a diagrammatic showing of an infra-red modulating device and a communication system.

A photosensitive cell 10, Figure 1, comprises a thimble 12, in an envelope 14, to define an inner chamber 16. Seated on the upper end of the thimble is the radiation responsive layer 18, of lead sulfide, which is connected to two wires 20 and 22. A capillary tube 24, enters the chamber to carry the lead sulfide into the cell, and to connect the chamber to a source of oxygen or to a vacuum pump. A second pipe 26, carries cold air into the thimble to quickly cool the seat upon which the lead sulfide is resting in the completed cell.

During the process of making the cell 10, as described in the application for patent of Rocard et al., Serial No. 395,168, filed November 30, 1953, active material is entered into the cell into zone 1, then heated to sublime the material to cause it to become deposited in zone 2, and again heated to finally cause it to become deposited in zone 3, in contact with the wires 20 and 22.

The cell 10, is advantageously placed in an electric oven 28, which has a wall of transparent material 30, and a pair of coils of wire to define heating means 32 and 34. The wires are suitably connected to power sources indicated by batteries 36 and 38. Conventional means may be employed to maintain the coils at the proper temperature such as a thermocouple 40 which indicates the temperature of the interior of the tube. Suitable means, indicated generally at 42, support the cell centrally of oven 28 and permit longitudinal movement therein.

In Figure 3 the cell is shown with its tube 24, selectively connectable to a source of oxygen 44 through a valve 46, or to a vacuum pump 48 through a valve 50. The pipe 26 is connected to a source of cold air 52 through a valve 54, and the valve 54 is provided with an arm 56 which engages an armature 58 so that the cold air cannot be placed in the thimble while the heating wires are energized. The armature is controlled by an electromagnet 60 provided with lead wires 62, and a switch 64 is also connected in this circuit.

The wires 20 and 22 are connected to a resistance measuring device 66, so that the resistance of the layer 18 may be determined.

In Figure 4, there is shown an arrangement by means of which much time is saved in processing a batch of cells. In this figure the cells 10, are shown each in its own individual oven 28, and with the tubes 24 connectable at will to a vacuum pump line 70 or to an oxygen line 72 through valves 74 and 76, respectively. The cold air lines 26 are shown connected with the interlocking means 56—60 just described.

The wires 20 and 22 are connected through a distributor switch 78 to the resistance measuring means 66, and a switch 80 is inserted in series with the switch 78 and is connectable in one position to connect a one volt battery 82 in series with a current reading meter 84, and in another position 86 in series with a current reading meter. When the cell 10 indicates, by the resistance of its effective layer 18, that it is up to standard, it is then tested by a one volt battery for its dark current reading, and is next tested by a dark body emitter, operating at a temperature of 300 degrees centigrade, having an emitting orifice of one square cm. and placed 27 mm. distant from the cell. This body is indicated at 88.

In Figure 5 there is shown means on the guided missile for detecting the presence of an airplane so that the missile may explode at the proper moment. In this figure a guided missile 90 carries a tube 92 in which is placed an infra-red responsive cell 94, such as a lead sulphide, lead telluride or lead selenide cell, coupled by its wires 96 and 98 through a conventional amplifier 100 to control means indicated generally at 102. For daylight use means are provided to control the light from the sun 104 entering the interior of the tube 92 and such means may take the form of a filter 108 placed in front of the lenses 106. The filter will eliminate all solar radiation below 4 microns. The carbon dioxide in the earth's atmosphere exerts a filtering effect on all solar radiation above about 4 microns so that a filter placed before the infra-red responsive cell 94 only allows transmission of radiation above 4 microns admitted at relatively close proximity to the guided missile.

In order to utilize the lead sulphide cell during day light operation in the above described manner, it is necessary that the lead sulphide cell be cooled with carbon dioxide snow or liquid air so that it will have a sensitivity above 4 microns. A lead selenide cell does not require such cooling for its operation. The lead telluride cell will operate satisfactorily only at the temperature of liquid air (−180° C.). For night time operation the lead selenide or cooled lead telluride cell will operate satisfactorily without the filter 108.

The airplane indicated generally at 110 is illustrative of an object to be detected. Chopper means, indicated generally at 95, is used to interrupt the incoming infra-red radiation from a detected plane so that the sensitivity of the infra-red cell detection unit is at its optimum. A chopping frequency of 8000 cycles per second for the lead sulphide cell and 2000 cycles per second for the lead telluride or lead selenide cells is recommended.

To a guided missile carrying the cell 94, the sun is a constant source of infra-red rays because of the great distance between the sun and the missile. On the other hand, the intensity of the rays received by the cell as it approaches a heated body will increase very rapidly because of the decreasing distance between missile and the heated body and because the intensity increases as the inverse square of the distance. This derivative may be utilized in electrical circuits on the missile in association with the control circuits, but the output of the amplifier may not exactly follow the inverse of the square of the distance because of the shape of the response curve of the cell 94. However, we do have the condition of a first constant source of infra-red rays for all practical purposes at a great distance from the sun, and of another source which seems to increase rapidly as the missile approaches the aeroplane.

There would be no significant Doppler effect in relation to the sun, but the relation of the Doppler effect between the aeroplane and the cell 94, would appear to be significant. Since the cell is a frequency responsive device under certain temperature conditions and with a selected responsive material, a useful responsive curve may be had to get a desired change in response to take advantage of the Doppler effect. Thus, it is possible to discriminate between energy from a constant source, such as the sun, and energy which appears to increase according to the inverse square of distance law, and with a change of frequency, as the missile approaches the heated and relatively proximate second source.

In Figure 6, there is shown a communication system comprising a transmitter 112, formed of a lamp 119 to emit infra-red rays, and connected with a microphone 114, through a conventional amplifier 116, and coupling means such as a transformer 118. Other modulating means may be employed such as a light gate in front of the lamp. The modulated output of the lamp is passed through a lens of magnesium glass 120, to permit the transmission of infra-red rays. The output of the lens 120, is received by a lead sulfide cell 122, connected to a conventional amplifier 124, and then through wires 126, to a loud speaker 128, or the like. The cell is suitably shielded by a tubular member 130, which carries a lens 132, of suitable glass coated with a coating of arsenic trisulfide if desired for the good transmission of infra-red rays.

Another means of modulating infra-red depends on the phenomenon that germanium is transparent in the infra-red range beyond 1.8 microns but its transparency can be modulated by an electric current which goes through it, apparently by means of the electrons and holes which are formed. As is shown in Figure 7, infra-red radiation from a source 134 is reflected by a parabolic mirror 136 through a germanium crystal section 138. This crystal section should be approximately 2 centimeters in length and one and a half to two millimeters wide. A voice actuated modulator 135 is connected to the crystal 138 so that infra-red radiation transmitted through the crystal section is modulated and impinges on a mirror 140 as a modulated signal. The infra-red radiation is then reflected from mirror 140 to mirror 142 and then to the infra-red responsive detector 144. This detector may be of lead sulphide, lead telluride or lead selenide and may be used for day light reception of modulated signals by use of the filter as described in Figure 6 above or for night use without a filter. The modulated infra-red radiation impinging on the sensitive area of the cell 144 causes the cell to emit a modulated electrical signal that is amplified by a conventional amplifier 146 to actuate the speaker 148. This communication system is useful for transmission, for example, up to 20 miles from plane to plane. It is also useful for the transmission of signals from ship to shore, plane to ground, plane to ship, etc. The usefulness becomes apparent when we realize that detection of the transmitted signal is not possible to the enemy by normal radio means and furthermore it will be extremely difficult or impossible to jam the signals.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a plurality of electric ovens with each of said ovens having a transparent wall and having means thereon to define a pair of heating zones of different temperatures, an envelope for a photosensitive cell in each of said ovens and having connections at will to a source of oxygen and to a vacuum pump, a source of cold air, means for applying cold air from said air source to said envelope in each oven, each of said cells having a pair of wires connectable at will to means for measuring the resistance of the photosensitive layer and to means for otherwise indicating the sensitivity of said layer.

2. In combination: a vacuum pump; a source of oxygen; an oven having a transparent wall and heating means to define a pair of zones therein of different temperatures; an envelope for a photosensitive cell having an outer wall adapted to be adjustably positioned within the transparent wall of said oven, a conduit extending into said envelope including valve means for selectively connecting said conduit to said vacuum pump and said source of oxygen; a source of cooling medium under pressure; and means including a valve for controlling application of the cooling medium to said cell envelope while in the oven upon de-energization of said heating means.

3. In combination: a vacuum pump; a source of oxygen; an oven having a transparent wall and heating means to define a pair of zones therein of different temperatures; an envelope for a photosensitive cell having an outer wall adapted to be adjustably positioned within the transparent wall of said oven, an aperture in a wall of said envelope containing a conduit in fluid tight relation with said envelope wall, a fluid line including valve means for selectively connecting said conduit to said vacuum pump and said source of oxygen; a source of a cooling medium under pressure; means including a valve for controlling application of the cooling medium to the cell envelope while in the oven upon de-energization of said heating means; and circuit means connected to terminals on said cells for measuring the electrical resistance of said cells while heated in said oven to provide an indication when said heating means is to be de-energized and said cooling medium applied to said cell.

References Cited in the file of this patent

UNITED STATES PATENTS

| Number | Name | Date |
|---|---|---|
| 2,006,771 | Kayko et al. | July 2, 1935 |
| 2,023,628 | Van Sant | Dec. 10, 1935 |
| 2,187,908 | McCreary | Jan. 23, 1940 |
| 2,384,025 | Graham | Sept. 4, 1945 |
| 2,403,387 | McLennan | July 2, 1946 |
| 2,421,012 | Chew | May 27, 1947 |
| 2,448,517 | Cashman | Sept. 7, 1948 |
| 2,515,263 | Raibourn | July 18, 1950 |
| 2,532,315 | Johnson et al. | Dec. 5, 1950 |
| 2,538,411 | Carter | Jan. 16, 1951 |
| 2,575,756 | Fulton et al. | Nov. 20, 1951 |